United States Patent [19]

Ravichandran et al.

[11] Patent Number: 4,717,748
[45] Date of Patent: Jan. 5, 1988

[54] COMPOSITIONS STABILIZED WITH SUBSTITUTED ALKOXYBENZYLHYDROXYLAMINES

[75] Inventors: Ramanathan Ravichandran, Yonkers; Thomas E. Snead, Dobbs Ferry, both of N.Y.

[73] Assignee: Ciba-Geigy Corporation, Ardsley, N.Y.

[21] Appl. No.: 912,859

[22] Filed: Sep. 29, 1986

[51] Int. Cl.⁴ .................. C07C 83/00; C07C 83/04; C08K 5/17
[52] U.S. Cl. .................................. 524/236; 564/301
[58] Field of Search .................. 564/301; 524/236

[56] References Cited
U.S. PATENT DOCUMENTS

| 3,219,700 | 11/1965 | O'Shea et al. | 564/300 |
| 3,219,701 | 11/1965 | O'Shea | 564/300 |
| 3,432,578 | 3/1969 | Martin | 564/300 |
| 3,467,711 | 9/1969 | Bader et al. | 564/300 |
| 3,644,244 | 2/1972 | Fryd et al. | 524/236 |
| 3,644,278 | 2/1972 | Klemchuk | 524/96 |
| 3,661,996 | 5/1972 | Bader et al. | 564/300 |
| 3,697,470 | 10/1972 | Haines et al. | 524/236 |
| 3,818,006 | 6/1974 | Klemchuk | 524/236 |
| 3,821,304 | 6/1974 | Klemchuk | 524/236 |
| 3,867,445 | 2/1975 | Klemchuk | 564/300 |
| 3,926,909 | 12/1975 | Wei | 524/236 |
| 4,312,887 | 1/1982 | Haviv | 564/300 |
| 4,350,606 | 9/1982 | Cuisia et al. | 564/300 |
| 4,386,224 | 5/1983 | Deetman | 568/703 |
| 4,590,231 | 5/1986 | Seltzer et al. | 524/236 |
| 4,612,393 | 9/1986 | Ravichandran | 564/300 |

Primary Examiner—Veronica P. Hoke
Attorney, Agent, or Firm—Harry Falber

[57] ABSTRACT

Substituted alkoxybenzylhydroxylamines of the formula

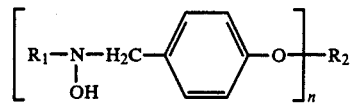

are effective in stabilizing organic materials against oxidative, thermal and actinic degradation, said derivatives being particularly effective as color improvers and process stabilizers in organic materials containing phenolic antioxidants; and certain of said derivatives as new compounds.

28 Claims, No Drawings

COMPOSITIONS STABILIZED WITH SUBSTITUTED ALKOXYBENZYLHYDROXYLAMINES

Organic polymeric materials such as plastics and resins are subject to thermal, oxidative and photodegradation. A great variety of stabilizers are known in the art for stabilizing a diversity of substrates. Their effectiveness varies depending upon the causes of degradation and the substrate stabilized. In general, it is difficult to predict which stabilizer will be most effective and most economical for any one area of application. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various organic hydroxylamine compounds are generally known and some are commercially available. A number of patents disclose nitrogen-substituted hydroxylamines as antioxidant stabilizers for various substrates including polyolefins, polyesters and polyurethanes. U.S. Pat. Nos. 3,432,578, 3,644,278, 3,778,464, 3,408,422, 3,926,909, 4,316,996 and 4,386,224 are representative of such patents which basically disclose N,N-dialkyl-, N,N-diaryl and N,N-diaralkyl hydroxylamine compounds and their color improvement and color stabilizing activity. For example, U.S. Pat. No. 3,926,909 discloses bis(4-methoxybenzyl)hydroxylamine, bis(4-ethoxybenzyl)hydroxylamine, bis(4-phenoxybenzyl)hydroxylamine and bis(4-butoxyphenyl)hydroxylamine as stabilizers for protecting spandex and other forms of polyurethanes.

It has now been determined that the compositions of this invention exhibit a variety of desirable properties stemming from the presence therein of the indicated hydroxylamine derivatives. Thus, the compounds serve to protect various substrates such as polyolefins, elastomers and lubricating oils against the adverse effects of oxidative and thermal degradation. These compounds are of higher molecular weight and thus more extraction resistant from the substrate. They are most effective as color improvers and process stabilizers in polyolefin compositions which may contain metal salts of fatty acids and which also contain a phenolic antioxidant. Thus, they serve to substantially reduce color formation resulting from the presence of the phenolic antioxidant and/or from the processing conditions as well as to directly protect the polymer from said processing conditions. They also prevent the discoloration of polyolefin compositions containing hindered amine light stabilizers or combinations of phenolic antioxidants and organic phosphites. In addition, the gas fading that may be experienced upon exposure to the combustion products of natural gas is also significantly reduced.

It is a primary object of this invention to provide compositions of organic materials stabilized against oxidative, thermal and actinic degradation by the presence therein of a class of substituted alkoxybenzylhydroxylamines.

It is a further object to provide such compositions which also contain phenolic antioxidants wherein said derivatives substantially reduce color formation resulting from the presence of said phenols.

It is still a further object to provide a specific class of novel substituted alkoxybenzylhydroxylamine derivatives which likewise exhibit a broad range of improved stabilization performance characteristics.

Various other objects and advantages of this invention will become evident from the following description thereof.

The stabilizing compounds utilized in the compositions of this invention correspond to the formula

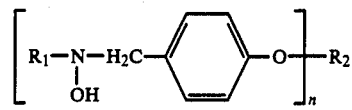

wherein
$R_1$ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms or $-OR_3$, wherein $R_3$ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

n is 1-4;

$R_2$, when n is 1, is hydrogen, alkyl of 1 to 36 carbon atoms, cycloalkyl of 5 to 12 carbon atoms, aralkyl of 7 to 9 carbon atoms, or said aralkyl substituted by alkyl of 1 to 36 carbon atoms;

$R_2$, when n is 2, is alkylene of 2 to 12 carbon atoms, alkylidene of 2 to 6 carbon atoms, cycloalkylene of 6 to 10 carbon atoms, arylene of 6 to 10 atoms or alkylenearylenealkylene of 8 to 10 carbon atoms;

$R_2$, when n is 3, is alkanetriyl of 3 to 6 carbon atoms; and $R_2$, when n is 4, is alkanetetrayl of 4 to 6 carbon atoms.

The $R_1$ group is preferably straight-chain or branched alkyl with 1 to 18 carbon atoms such as methyl, ethyl, n-propyl, n-butyl, tert-butyl, n-pentyl, n-octyl, 2-ethylhexyl, decyl, dodecyl and octadecyl; cyclopentyl and cyclohexyl; benzyl, α-methylbenzyl and α,α-dimethylbenzyl; and the substituted benzyloxy group wherein $R_3$ is preferably the same as the preferred $R_1$ groups absent benzyloxy.

$R_2$, when n is 1, is preferably similar to the list of preferred $R_1$ groups absent benzyloxy. It is further preferred that $R_2$ is identical to $R_3$ when n is 1 and $R_1$ is substituted benzyloxy.

$R_2$, when n is 2, is preferably alkylene of 2 to 12 carbon atoms, including ethylene, hexamethylene and octamethylene, ethylidene, cyclohexylene, phenylene and xylylene.

$R_2$, when n is 3, is preferably glyceryl and trimethylyl propane, while $R_2$, when n is 4, is preferably pentaerythrityl.

The primary method for preparing the derivatives involves reacting the appropriately unsubstituted or substituted hydroxyamine hydrochloride with an appropriately substituted benzyl bromide $(BrCH_2C_6H_4O)_nR_2$ in a solvent to yield the desired product. The solvent can be an aromatic hydrocarbon such as benzene, toluene, xylene, and the like, a heterocyclic ether such as tetrahydrofuran, or preferably a solvent such as dimethylformamide. The reaction temperature ranges from 25° to 100° C. It is preferred in this reaction approach to conduct the reaction in the presence of an acid acceptor such as sodium carbonate. The starting materials are items of commerce or can be prepared by known methods.

The compounds utilized in the compositions of the present invention are particularly effective in stabilizing organic materials subject to oxidative, thermal and actinic degradation, such as plastics, polymers and resins.

Substrates in which these compounds are particularly useful are polyolefins such as polyethylene and polypropylene; polystyrene, including impact polystyrene, ABS resin, SBR, isoprene, as well as natural rubber, polyesters including polyethylene terephthalate and polybutylene terephthalate, including copolymers, and lubricating oils such as those derived from mineral oil.

In general polymers which can be stabilized include

1. Polymers of monoolefins and diolefins, for example polyethylene (which optionally can be crosslinked), polypropylene, polyisobutylene, polybutene-1, polymethylentene-1, polyisoprene or polybutadiene, as well as polymers of cycloolefins, for instance of cyclopentene or norbornene.

2. Mixtures of the polymers mentioned under (1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/arylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under (5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamide and polyacrylonitrile.

9. Copolymers from the monomers mentioned under (8) with each other or with other unsaturated monomers, such as, for instance, acrylonitrile/butadiene, acrylonitrile/alkyl acrylate, acrylonitrile/alkoxyalkyl acrylate or acryloacrylate, nitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane]terephthalate and polyhydroxybenzoates as well as blockcopolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.

29. Aqueous emulsions of natural or synthetic rubber, e.g. natural latex or latices of carboxylated styrene/-butadiene copolymers.

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1 Antioxidants 1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol
 1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol
1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)
 1.4. Alkylidene-bisphenols, for example,
2,2'-methylene-bis-(6-tert.butyl-4-methylphenol)
2,2'-methylene-bis-(6-tert.butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.butyl-4-methylphenyl]-terephthalate.
 1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)sulfide
3,5-di-tert.butyl-4-hydroxybenzyl-mercapto-acetic acid isooctyl ester
bis-(4-tert.butyl-3-hydroxy-2,6-dimethylbenzyl)dithiol-terephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt
 1.6 Acylaminophenols, for example,
4-hydroxy-lauric acid anilide
4-hydroxy-stearic acid anilide
2,4-bis-octylmercapto-6-(3,5-tert.butyl-4-hydroxyanilino)s-triazine
octyl-N-(3,5-di-tert.butyl-4-hydrixphenyl)-carbamate
 1.7. Esters of ? -(3,5-di-tert-butyl-4-hydroxphenyl)-propionic acid with monohydric or polyhydric alcohols, for example,

| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β -(5-tert-butyl-4-hydroxy-3-methylphenyl)-propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid for example,
N,N'-di-(3,5-di-tert.butyl-4-hydroxyphenylpropionyl)-hexamethylenediamine
N,N'-di-(3,5-di-tert.butyl-4-hydroxyphenylpropionyl)-trimethylenediamine
N,N'-di-(3,5-di-tert.butyl-4-hydroxyphenylpropionyl)-hydrazine 2. UV absorbers and light stabilizers 2.1. 2-(2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl5'-tert.butyl-, 4'-octoxy, 3',5'-di-tert.amyl-, 3',5'-bis-(α,α-dimethylbenzyl)-derivative.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Esters of optionally substituted benzoic acids for example, phenyl salicylate, 4-tert.butyl-phenylsalicylate, octylphenyl salicylate, dibenzoylresorcinol, bis-(4-tert.butylbenzoyl)-resorcinol, benzoylresorcinol, 3,5-di-tert.butyl-4-hydroxybenzoic acid 2,4-di-tert.butyl-phenyl ester and 3,5-di-tert.-butyl-4-hydroxybenzoic acid hexadecyl ester.

2.4 Acrylates, for example, α-cyano-62,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyanovinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'(2,2,6,6-tetramethylpiperidyl)-hexamethylenediamine and 4-tert.octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone).

2.7. Oxalic acid diamides, for example, 4,4'-di-octyloxyoxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis (3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.butylphenyl)pentaerythritol diphosphite, tristearylsorbite triphosphite, tetrakis-(2,4-ditert.butylphenyl)-4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyldisulfide, pentaerythritol-tetrakis(β-dodecylmercapto)-propionate.

6. Polyamide stabilizers, for example copper salts in combination with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibers, asbestos, talc, kaolin, mica, barium sulfate, metal oxides and hydroxides, carbon black, graphite.

10. Other additives, for example, plasticizers, lubricants, emulsifiers, pigments, optical brighteners, flame-proofing agents, anti-static agents, blowing agents and thiosynergists such as dilaurylthiodipropionate or distearyl-thiodipropionate.

While the instant hydroxylamine derivatives can be beneficially used as stabilizers for a variety of substrates, particularly polyolefins, both alone and in conjunction with other coadditives, the introduction of the instant compounds into polyolefins, optionally containing various alkali metal, alkaline earth metal and aluminum salts of higher fatty acids (see Additive #7 hereinabove), with hindered phenolic antioxidants results in enhanced and particularly salubrious protection to such substrates in terms of reducing color formation stemming from the presence of the phenols. Such phenolic antioxidants include n-octadecyl 3,5-di-tert-butyl-4-hydroxyhydrocinnamate, neopentanetetrayl tetrakis-(3,5-di-tert-butyl-4- hydroxyl-hydrocinnamate), di-n-octadecyl 3,5-di-tert-butyl-4-hydroxybenzyl-phosphonate, 1,3,5-tris(3,5-di-tert-butyl-4-hydroxy-benzyl)isocyanurate, thiodiethylene bis(3,5-di-tert-butyl-4-hydroxyhydrocinnamate), 1,3,5-trimethyl-2,4,6-tris (3,5-di-tert-butyl-4-hydroxybenzyl)benzene, 3,6-di-oxaoctamethylene bis(3-methyl5-tert-butyl-4-hydroxyhydrocinnamate), 2,6-di-tert-butyl-p-cresol, 2,2'-ethylidene-bis(4,6-di-tert-butylphenol), 1,3,5-tris(2,6-di-methyl-4-tert-butyl-3-hydroxybenzyl)isocyanurate, 1,1,3-tris-(2-methyl-4-hydroxy-5-tert-butylphenyl)butane, 1,3,5-tris-[2-(3,5-di-tert-butyl-4-hydroxy-hydrocinnamoyloxy) -ethyl]-isocyanurate, 3,5-di-(3,5-di-tert-butyl-4hydroxybenzyl)-mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl-3,5-di-tert-butyl-4-hydroxybenzylphosphonate), ethylene bis[3,3-di(3-tert-butyl-4-hydroxyphenyl)butyrate], octyl 3,5-di-tert-butyl4-hydroxybenzylmercaptoacetate, bis(3,5-di-tert-butyl4-hydroxyhydrocinnamoyl)hydrazide, and N,N'-bis-[2-(3,5-tert-butyl-4-hydroxyhydroxo-cinnamoyloxy)-ethyl]-oxamide, and preferably neopentanetetrayl tetrakis(3,5-di-tert-butyl- 4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxy-benzyl) isocyanurate, 2,6-di-tert-butyl-p-cresol or 2,2'-ethylidene-bis(4,6-di-tert-butylphenol).

Likewise, the instant compounds prevent color formation when hindered amine light stabilizers are present, such hindered amines including bis(1,2,2,6,6-pentamethyl-4-piperidyl)-2-n-butyl-2-(3,5-di-tert-butyl-4-hydroxybenzyl) malonate; bis(2,2,6,6-tetramethyl-4-piperidyl) sebacate; dimethylsuccinate polymer with 4-hydroxy-2,2,6,6-tetramethyl-1-piperidinethanol; and polymer of 2,4-dichloro-6-octylamino-s-triazine with N'-(2,2,6,6-tetramethyl-4-piperidyl)hexamethylene diamine.

As previously noted, certain hydroxylamine derivatives also form part of the instant invention. These derivatives correspond to the generic formula above wherein n is 2-4 (labelled m for these compounds). The various substituent definitions, preferred substituents, preparative procedures and utility statements noted hereinabove equally apply to these novel hydroxylamine derivatives. The following examples illustrate the embodiments of this invention. Thus, they describe the preparation of various hydroxylamine derivatives, including those forming part of the invention, and of stabilized compositions. In these examples, all parts given are by weight unless otherwise specified.

EXAMPLE I

N, N-Bix-[p-methoxybenzyl]hydroxylamine

A stirred mixture of 4.66 g of hydroxylamine hydrochloride and 28.4 g of sodium carbonate in 100 ml of dimethylformamide is admixed with a solution of 26.89 g of p-methoxybenzylbromide in 50 ml of dimethylformamide. After stirring at room temperature for 15 hours, the mixture is filtered and the filtrate concentrated under reduced pressure to leave a pale yellow residue. Trituration with ethanol affords the product as a white solid, mp 109°-11 °C.

Anal. calcd. for $C_{16}H_{19}NO_3$: C, 70.3; H, 7.1; N, 5.1
Found: C, 70.4; H, 7.3; N, 5.3

EXAMPLE II

N,N-Bis-[p-octadecyloxybenzyl]hydroxylamine

The procedure of Example I is repeated using 7.24 g of sodium carbonate, 1.22 g of hydroxylamine hydrochloride and 15.38 g. of p-octadecyloxybenzylbromide in dimethylformamide, to give the title compound as a white solid, M.P. 81°-83°C.

Anal. calcd. for $C_{50}H_{87}NO_3$: C, 80.1; H, 11.7; N, 1.9
Found: C, 79.7; H, 12.0; N, 1.9

EXAMPLE III 1,12-Bis[4-(N-benzylhydroxyiminomethyl)phenoxy]dodecane

A mixture of 0.49 g of N-benzylhydroxylamine, 1.08 g of 1,12-bis[4-(bromomethyl)phenoxy]dodecane and 0.42 g of sodium carbonate in 5 ml of dimethylformamide is stirred at room temperature for 8 hours. The reaction mixture is partitioned between ethyl acetate and water, and the organic extract is washed with water, brine, dried (MgSO$_4$) and concentrated under reduced pressure. The residue is purified by flash chromatography to afford the title compound as a white solid, mp 105°-108°C.

Anal. Calcd. for $C_{40}H_{52}N_2O_4$: C, 76.9; H, 8.4; N, 4.5
Found: C, 76.3; H, 8.4; N, 4.5

EXAMPLE IV

Processing of Polypropylene

| Base formulation | |
|---|---|
| Polypropylene* | 100 parts |
| Calcium Stearate | 0.10 part |

*Profax 6501 from Himont U.S.A.

Stabilizers are solvent blended into polypropylene as solutions in methylene chloride and after removal of solvent by evaporation at reduced pressure, the resin is extruded using the following extruder conditions:

| | Temperature (°C.) |
|---|---|
| Cylinder #1 | 232 |
| Cylinder #2 | 246 |
| Cylinder #3 | 260 |
| Gate #1 | 260 |
| Gate #2 | 260 |
| Gate #3 | 260 |
| RPM | 100 |

During extrusion, the internal extruder pressure is determined using a pressure transducer. After each of the first, third and fifth extrusions, resin pellets are compression molded into 125 mil (3.2 mm) thick plaques at 193° C. and specimen yellowness index (Y.I) determined according to ASTM D1925-63T.

The melt flow rate (MFR) is determined by ASTM method 1238 condition L. The melt flow rate varies inversely as the transducer pressure and both are a measure of the molecular weight for a specific type of polymer. The results are shown in the following tables.

| | Extrusion Temperature 260° C. YI Color After Extrusion | | |
|---|---|---|---|
| Additives | 1 | 3 | 5 |
| Base Resin | 4.4 | 6.6 | 8.0 |
| 0.1% Antioxidant A | 7.1 | 11.0 | 12.0 |
| 0.1% Antioxidant A + 0.05% Ex. I | 4.1 | 5.7 | 6.1 |

| Extrusion Temp. (260° C.) YI Color After Extrusion | MFR (g/10 min) MFR (g/10 min) After Extrusion |
|---|---|

| Additives | Extrusion Temperature 260° C. YI Color After Extrusion | | | | |
|---|---|---|---|---|---|
| | 1 | 3 | 5 | 1 | 5 |
| Base Resin | 2.5 | 3.5 | 4.7 | 6.3 | 14.9 |
| 0.1% Antioxidant A | 7.4 | 13.2 | 15.9 | 3.4 | 6.9 |
| 0.1% Antioxidant A + 0.05% Ex. II | 2.1 | 3.8 | 6.5 | 2.6 | 4.0 |

Antioxidant A - Neopentyl tetrakis[3-(3'5'-di-tert-butyl-4'-hydroxyphenyl) propanoate]

These data thus indicate the efective color improving properties and process stabilization characteristics of the instant compounds.

Summarizing, it is seen than this invention provides organic materials stabilized against degradation by the presence therein of various hydroxylamine derivatives as well as certain of said hydroxylamine derivatives. Variations may be made in proportions, procedures and materials without departing from the scope of the invention as defined by the following claims.

What is claimed is:

1. A composition of matter comprising an organic material subject to oxidative, thermal and actinic degradation stabilized with an effective stabilizing amount of a compound of the formula

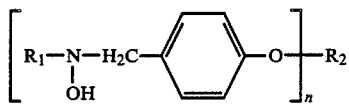

wherein

R$_1$ is hydrogen, alkyl of 1 to 36 carbon atoms, cycloalky of 5 to 12 carbon atoms, aralkyl of 7 to 9 carbon atoms of said aralkyl substituted by alkyl of 1 to 36 carbon atoms or —OR$_3$, wherein R$_3$ is hydrogen, alkyl of 1 to 36 carbon atoms, cycloalkyl of 5 to 12 carbon atoms, aralkyl or 7 to 9 carbon atoms or said aralkyl substituted by alkyl of 1 to 36 carbon atoms;

n is 2–4;

R$_2$, when n is 2, is alkylene of 2 to 12 carbon atoms, alkylidene of 2 to 6 carbon atoms, cycloalkylene of 6 to 19 carbon atoms, arylene of 6 to 10 carbon atoms or alkylearylenealkylene of 8 to 10 carbon atoms;

R$_2$, when n is 3, is alkanetriyl of 3 to 6 carbon atoms; and

R$_2$, when n is 4, is alkanetetrayl of 4 to 6 carbon atoms.

2. The composition of claim 1, wherein R$_1$ is alkyl of 1 to 18 carbon atoms, cycloalkyl of 5 to 6 carbon atoms, benzyl, α-methyl benzyl or α,α-dimethylbenzyl.

3. The composition of claim 1, wherein R$_1$ is

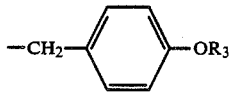

and R$_3$ is alkyl of 1 to 18 carbon atoms, cycloalkyl of 5 to 6 carbon atoms, benzyl, α-methylbenzyl or α,α-dimethylbenzyl.

4. The composition of claim 1, wherein n is 2.

5. The composition of claim 4, wherein R$_2$ is alkylene of 2 to 12 carbon atoms, ethylidene, cyclohexylene, phenylene or xylylene.

6. The composition of claim 5, wherein said compound is 1,12-bis[4-(N-benzylhydroxyiminomethyl)-phenoxy]dodecane.

7. The composition of claim 1, wherein the organic material is a synthetic polymer.

8. The composition of claim 7, wherein the synthetic polymer is a polyolefin polymer or copolymer.

9. The composition of claim 8 which also contains a metal salt of a higher fatty acid.

10. The composition of claim 1 which also contains a phenolic antioxidant.

11. The composition of claim 9 which also contains a phenolic antioxidant.

12. The composition of claim 10, wherein said phenolic antioxidant is selected from the group consisting of n-octadecyl 3,5-di-tert-butyl-4-hydroxyhydrocinnamate, neopentanetetrayltetrakis-(3,5-di-tert-butyl-4-hydroxyl-hydrocinnamate), di-n-octadecyl 3,5-di-tert-butyl-4-hydroxy-benzyl-phosphonate, 1,3,5-tris(3,5-di-tert-butyl -4-hydroxybenzyl)isocyanurate, thiodiethylene bis(3,5-di-tert-butyl-4-hydroxyhydrocinnamate), 1,3,5-tri-methyl -2,4,6-tris (3,5-di-tert-butyl-4-hydroxybenzyl)benzene, 3,6-di-oxaocta-methylene bis(3-methyl-5-tert-butyl -4-hydroxyhydro-cinnamate), 2,6-di-tert-butyl-p-cresol, 2,2'-ethylidene-bis(4,6-di-tert-butyl-phenol), 1,3,5-tris(2,6-di-methyl-4-tert-butyl-3-hydroxybenzyl)isocyanurate, 1,1,3-tris-(2-methyl-4-hydroxy-5-tert-butyl-phenyl) butane, 1,3,5-tris-[2-(3,5-di-tert-butyl-4-hydroxy-hydro-cinnamoyl-oxy) -ethyl]-isocyanurate, 3,5-di-(3,5-di-tert-butyl-4-hydroxybenzyl) -mesitol, hexamethylene bis(3,5-di-tert-butyl-4-hydroxyhydrocinnamate), 1-(3,5-di-tert-butyl-4-hydroxyanilino) -3,5-di(octylthio)-s-triazine, N,N'-hexamethylene-bis(3,-5di-tert-butyl-4-hydroxyhydro-cinnamamide), calcium bis(ethyl-3,5-di-tert-butyl-4-hydroxybenzylphosphonate), ethylene bis[3,3-di(3-tert-butyl- 4-hydroxyphenyl) butyrate], octyl, 3,5-di-tert-butyl-4-hydroxybenzylmercaptoacetate, bis(3,5di-tert-butyl-4-hydroxyhydrocinnamoyl) hydrazide, and N,N'-bis[2-(3,5-tert-butyl-4-hydroxyhydroxo-cinnamoyloxy) ethyl]-oxamide.

13. The composition of claim 12, wherein said phenolic antioxidant is neopentanetetrayl tetrakis(3,5-di-tert-butyl-4-hydroxyhydrocinnamate), n-octadecyl 3,5-di-tert-butyl- 4-hydroxyhydrocinnamate, 1,3,5-trimethyl-2,4,6-tris (3,5-di-tert-butyl-4-hydroxybenzyl,benzene, 1,3,5-tris-(3,5-di-tert-butyl-4-hydroxybenzyl)isocyanurate, 2,6-di-tert-butyl-p-cresol or 2,2'-ethylidene-bis-(4,6di-tert-butylphenol).

14. A method for stabilizing an organic material against oxidative, thermal and actinic degradation which comprises stabilizing amount of a compound of claim 7.

15. A composition of matter comprising a polyolefin homo- or copolymer subject to oxidative, thermal and actinic degradation stabilized with an effective stabilizing amount of a compound of the formula

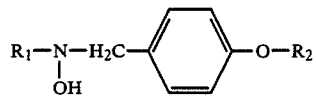

wherein

R₁ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms or —OR₃, wherein R₃ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms; and R₂ is hydrogen, alkyl of 1 to 36 carbon atoms, cycloalkyl of 5 to 12 carbon atoms, aralkyl of 7 to 9 carbon atoms, or said aralkyl substituted by alkyl of 1 to 36 carbon atoms.

16. The composition of claim 15, wherein R₁ is

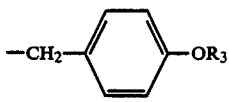

and R₃ is alkyl of 1 to 18 carbon atoms, cycloalkyl of 5 to 6 carbon atoms, benzyl, α-methylbenzyl or α,α-dimethylbenzyl.

17. The composition of claim 15, which also contains a phenolic antioxidant.

18. The composition of claim 17, which also contains a metal salt of a higher fatty acid.

19. The composition of claim 15, wherein R₂ is alkyl of 1 to 18 carbon atoms, cycloalkyl of 5 to 6 carbon atoms, benzyl, α-methylbenzyl or α,α-dimethylbenzyl.

20. The composition of claim 16, wherein n is 1 and R₂ is identical to R₃.

21. The composition of claim 20, wherein said composition is N,N-bis-[p-methoxybenzyl]hydroxylamine.

22. The composition of claim 20, wherein said compound is N,N-bis-[p-octadecyloxybenzyl]hydroxylamine.

23. A compound of the formula

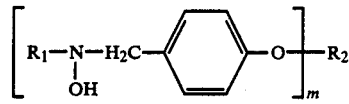

wherein

R₁ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms or —OR₃, wherein R₃ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

m is 2–4;

R₂, when m is 2, is alkylene of 2 to 12 carbon atoms, alkylidene of 2 to 6 carbon atoms, cycloalkylene of 6 to 10 carbon atoms, arylene of 6 to 10 carbon atoms or alkylenearylenealkylene of 8 to 10 carbon atoms;

R₂, when m is 3, is alkanetriyl of 3 to 6 carbon atoms; and

R₂, when m is 4, is alkanetetrayl of 4 to 6 carbon atoms.

24. The compound of claim 23, wherein R₁ is alkyl of 1 to 18 carbon atoms, cycloalkyl of 5 to 6 carbon atoms, benzyl, α-methyl benzyl or α,α-dimethylbenzyl.

25. The compound of claim 23, wherein R₁ is

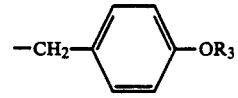

and R₃ is alkyl of 1 to 18 carbon atoms, cycloalkyl of 5 to 6 carbon atoms, benzyl, α-methylbenzyl or α,α-dimethylbenzyl.

26. The compound of claim 23, wherein is m is 2.

27. The compound of claim 26, wherein R₂ is alkylene of 2 to 12 carbon atoms, ethylidene, cyclohexylene, phenylene or xylylene.

28. 1,12-Bis[4-(N-benzylhydroxyiminomethyl)-phenoxy]-dodecane according to claim 27.

* * * * *